US005477840A

United States Patent [19]

Neumann

[11] Patent Number: 5,477,840

[45] Date of Patent: Dec. 26, 1995

[54] BOOST PRESSURE CONTROL FOR SUPERCHARGED INTERNAL COMBUSTION ENGINE

[75] Inventor: Barry R. Neumann, Australind, Australia

[73] Assignee: Transcom Gas Technology Pty. Ltd., Herdsman, Australia

[21] Appl. No.: 232,134

[22] PCT Filed: Oct. 23, 1992

[86] PCT No.: PCT/AU92/00574

§ 371 Date: Jun. 28, 1994

§ 102(e) Date: Jun. 28, 1994

[87] PCT Pub. No.: WO93/08394

PCT Pub. Date: Apr. 29, 1993

[30] Foreign Application Priority Data

Oct. 23, 1991 [AU] Australia .............................. PK 9065

[51] Int. Cl.[6] .............................. F02B 33/00; F02D 23/00

[52] U.S. Cl. .............................. 123/564

[58] Field of Search .............................. 60/600, 602, 611; 123/564

[56] References Cited

U.S. PATENT DOCUMENTS

| | | | |
|---|---|---|---|
| 3,421,314 | 1/1969 | Michalke . | |
| 3,925,989 | 12/1975 | Pustelnik | 60/602 |
| 4,467,608 | 8/1984 | Matushiro et al. | 60/602 |
| 4,480,614 | 11/1984 | Kobashi et al. | 123/339 |
| 4,496,286 | 1/1985 | Gagnon . | |
| 4,769,995 | 9/1988 | Serve et al. . | |
| 5,154,155 | 10/1992 | Ohnaka et al. | 123/564 |

FOREIGN PATENT DOCUMENTS

| | | | |
|---|---|---|---|
| 0224732 | 6/1987 | European Pat. Off. . | |
| 3005108 | 8/1981 | Germany | 60/602 |
| 57-46043 | 3/1982 | Japan . | |
| 2211245 | 6/1989 | United Kingdom . | |

*Primary Examiner*—Michael Koczo
*Attorney, Agent, or Firm*—Fish & Richardson

[57] ABSTRACT

An apparatus and method for controlling the boost pressure of air delivered to a gas fuelled internal combustion engine from air compression means such as a turbocharger. An engine management system (EMS) controls a spark ignition system as well as a gas delivery system for controlling the delivery of gaseous fuel to a fuel inlet. Air is delivered to the engine through air inlet via air throttle means which is also under the control of the EMS. Boost pressure is controlled by an exhaust control valve which is operative to direct a proportion of the exhaust gases to turbocharger. The amount of compression of the air depends on the proportion of the exhaust gases diverted to the turbocharger, which is variable when the engine is operating on gaseous fuel under the control of EMS. Pressure and temperature sensor senses the actual boost pressure and provides a feedback signal to EMS which then compares the actual pressure with a desired boost pressure determined in accordance with at least one operating parameter of the engine, such as engine speed and load, and adjusts the condition of control valve accordingly.

9 Claims, 4 Drawing Sheets

74 78 80 84 81 78 92 82 76 88 90 86

10
12
14
16
18
20
22
24
25
26
28
30
32
34
36
38
40
42
44
46
48
50
52
54
56
58
60
62
64
66
68
70
72

80
78
88
90
92
86
78
81
76
84
74
82

BOOST PRESSURE CONTROL FOR SUPERCHARGED INTERNAL COMBUSTION ENGINE

FIELD OF THE INVENTION

The present invention relates to an apparatus and method of boost pressure control in the delivery of air to support combustion in a gas fuelled internal combustion (IC) engine. The invention relates more particularly, but not exclusively, to boost pressure control in an (IC) engine which has been converted from operation on diesel fuel to a gaseous fuel by the addition of a gas delivery system and a spark ignition system. The invention is also applicable to a so-called dual fuel engine in which a small amount of pilot fuel, such as diesel fuel, is used instead of spark ignition to initiate combustion of gaseous fuel. In each case, air is delivered to the engine to support combustion of the fuel.

BACKGROUND TO THE INVENTION

When an engine is operating on diesel fuel, the power output of the engine is governed by smoke emissions in the exhaust. To increase the power of the engine, the amount of diesel fuel burnt in each engine cycle needs to be increased, but this creates unacceptable dense black exhaust emissions, as the relative proportion of diesel fuel to air is increased. Typically, the maximum amount of diesel fuel which can be introduced into the engine before the exhaust emission becomes unacceptable is only about 70% of the maximum which can undergo complete combustion in the engine with the corresponding amount of air which is induced into the engine. Hence the power output of the engine is limited.

When an engine is operating on gaseous fuel, the engine does not suffer from the same exhaust problem, and hence up to 100% of the maximum proportion of gaseous fuel to air which can be completely combusted in the corresponding amount of air, can be introduced into the engine, so that the engine can develop maximum power.

To overcome the exhaust emission problems with conventional diesel engines, a turbocharging or supercharging system may be used. Conventionally, in a turbocharged arrangement, a turbine wheel is operated by the exhaust gasses of the engine, and the turbine wheel in turn rotates an air compression wheel. In a supercharged arrangement, such an air compression wheel is powered by alternative power means such as a direct mechanical coupling between the air compression wheel and an output shaft of the engine, or an auxiliary power means. In each case, the air is introduced into the engine under compression (boost pressure) so that a greater quantity of air is present. Thus more diesel fuel can be introduced into the engine in each cycle of operation, whilst the proportion of diesel fuel to air need not exceed the 70% maximum permitted before the exhaust emission becomes unacceptable. Because more diesel fuel can be thus introduced, the power output of the engine is correspondingly increased.

However, a turbocharging or supercharging system in an engine operating on gaseous fuel cannot improve the performance of the engine. In fact, the performance of the engine can be severely limited. This is because the heat produced during initial compression of the gaseous fuel/air mixture before the ignition process is commenced, is greater in a charged engine than in an uncharged engine, and the additional heat can cause the gaseous fuel/air mixture to explode rather than burn progressively, or worse still, the mixture can start burning from self-ignition in an uncontrolled manner before ignition is introduced, and before maximum compression is reached. Hence, the power output of the engine may be decreased. Therefore, it is usual for an engine operating on a gaseous fuel not to be turbocharged or supercharged, or if they are, to a lesser extent than diesel engines.

SUMMARY OF THE INVENTION

The present invention was developed with a view to providing boost pressure control in the delivery of air to a gas fuelled internal combustion engine to achieve improved performance from the engine.

According to one aspect of the present invention there is provided a boost pressure control apparatus for controlling the boost pressure of air delivered to a gas fuelled internal combustion engine, the apparatus comprising;

air delivery means for delivering air to the engine to support combustion of a gaseous fuel;

air compression means for boosting the pressure of air delivered to the engine by said air delivery means above an ambient pressure; and, air control means, responsive to at least one operating parameter of the engine, for controlling the boost pressure of air delivered from said air compression means to the engine, said air control means comprising a boost pressure control valve which is operated under the control of a processor means responsive to said at least one operating parameter, said boost pressure control valve being located downstream from the air compression means and adapted to dump air directly from an air delivery line delivering air to an inlet manifold of the engine, wherein said boost pressure control valve is actuated by an electric motor responsive to a control signal from said processor means whereby, in use, the boost pressure can be continuously varied in response to changes in said at least one operating parameter to achieve improved performance from the engine.

Typically said at least one operating parameter includes the engine speed and load. Preferably said at least one operating parameter also includes the actual manifold absolute pressure.

Typically the air compression means comprises a turbo charger having a turbine which is driven by exhaust gasses from the engine, and said air control means may comprise an exhaust control valve which is operated under the control of processor means, responsive to said at least one operating parameter, for directing a variable proportion of the exhaust gasses to the turbocharger along a first exhaust path and then to an exhaust emissions outlet, and the remainder along a second exhaust path directly to the exhaust emissions outlet or to another exhaust emissions outlet.

The invention is also applicable where the engine is a dual fuel engine, in which case the air control means may also be responsive to the type of fuel being introduced. Where a second fuel is diesel fuel, the air control means may be responsive to control the boost pressure of air to a maximum degree to which the air compression means is capable, when the engine is operating on diesel fuel alone. When the engine is operating on gaseous fuel, the temperature of the air delivered to engine may be varied from ambient temperature by a first amount which is less than a second amount by which the temperature of the air may be varied from the ambient temperature when the engine is operating on diesel fuel or another secondary fuel, to achieve optimum conditions.

According to another aspect of the present invention there is provided a method of controlling boost pressure of air delivered to a gas fuelled internal combustion engine, the method comprising:

delivering air to the engine to support combustion of a gaseous fuel;

boosting the pressure of air delivered to the engine above an ambient temperature; and, regulating the boost pressure of air delivered to the engine, wherein said step of regulating the boost pressure comprises:

detecting the actual pressure of air delivered to the engine;

calculating a desired pressure of air delivered to the engine in accordance with said at least one operating parameter;

comparing the actual pressure with the desired pressure of air delivered to the engine; and, actuating a boost pressure control valve as required to lower or increase the boost pressure of air delivered to the engine, and wherein said step of actuating the boost pressure control valve comprises:

operating the valve at a first speed when the actual pressure is above or below the desired pressure by a first prescribed amount; and, operating the valve at a second speed which is higher than said first speed when the actual pressure is above or below the desired pressure by a second prescribed amount which is greater than the first prescribed amount, whereby, in use, the boost pressure can be continuously varied in response to changes in said at least one operating parameter to achieve improved performance from the engine.

Preferably, the method further comprises cooling the air delivered to the engine after said step of boosting the pressure of the air above an ambient pressure.

BRIEF DESCRIPTION OF THE DRAWINGS

In order to facilitate a better understanding of the nature of the invention, several embodiments of boost pressure control apparatus and method will now be described in detail, by way of example only, with reference to accompanying drawings in which.

DETAILED DESCRIPTION OF PREFERRED EMBODIMENTS

Figure 1:
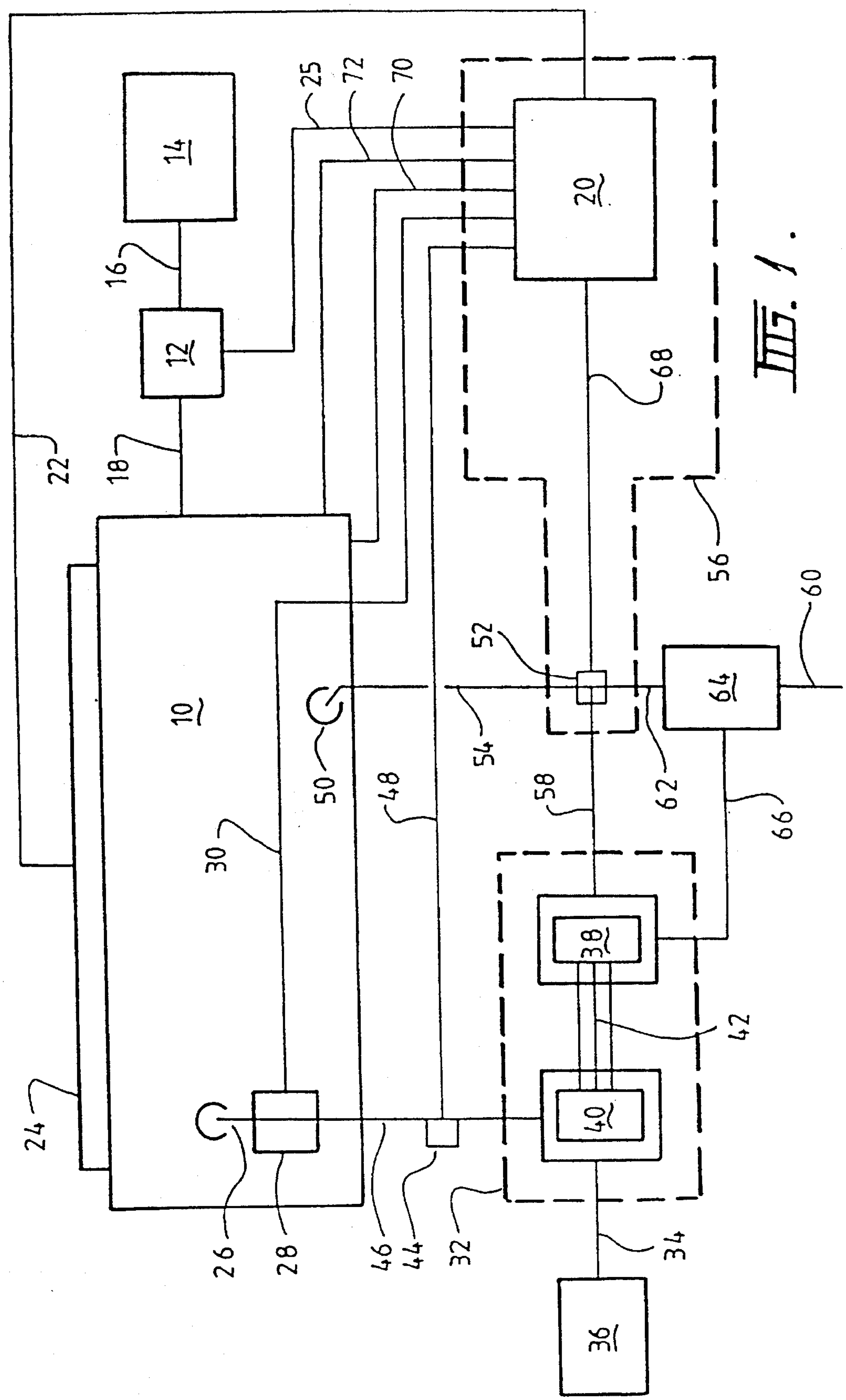
FIG. 1 is a functional block diagram of one embodiment of a boost pressure control apparatus according to the invention.

Referring to FIG. 1, a spark ignited internal combustion engine is illustrated diagrammatically at 10. The engine 10 is capable of operating on a gaseous fuel, and is provided with a gas delivery system 12 for controlling the delivery of gaseous fuel from a gas reservoir 14, via a gas delivery line 16 to a fuel inlet 18 of the engine. Gas delivery system 12 is under the control of an engine management system 20 via control line 25. The gaseous fuel is introduced into the engine 10, as is well known in the art, during the induction part of the duty cycle of the engine, along with air. The engine management system 20 delivers a signal via ignition control line 22 to a spark ignition system 24, which causes the fuel introduced into the engine to be ignited and hence provide the power part of the engine duty cycle. In this embodiment, air to support combustion is delivered to the engine through air inlet 26, for example, the inlet manifold of the engine, via air throttle means 28 which is also under the control of the engine management system (EMS) 20 via throttle control line 30. Air throttle means 28 may comprise, for example, a manifold valve for controlling the manifold absolute pressure.

Air is delivered to inlet 26 via air throttle means 28 from an air compression means 32 which in this embodiment comprises a turbocharger system. Air at ambient pressure is supplied to the turbocharger 32 through an air delivery line 34 from an air filter 36, which is open to atmosphere. Air delivered to the turbocharger 32 may be warmed by contact with a hot part of the engine 10. The turbocharger 32 comprises a turbine wheel 38 which is driven by exhaust gasses produced as a result of combustion in the engine 10. Turbine wheel 38 turns a compressor 40 by means of drive shaft 42. Compressor 40 boosts the pressure of air delivered to the engine 10 via air throttle means 28, above an ambient pressure. Sensor 44 senses the boost air pressure and temperature in the boost air delivery line 46 and provides a feed-back signal indicative of the boost air pressure and temperature to the EMS 20 via control line 48.

Exhaust gasses exit from the engine 10 via an exhaust outlet 50 to exhaust control means 52 through an exhaust delivery line 54. Exhaust control means 52 is part of an air control means 56 which is responsive to at least one operating parameter of the engine, for controlling the boost pressure of air delivered from the turbocharger 32 to the engine. Air control means 56 also comprises the EMS 20. Exhaust control means 52 may be, for example, a waste gate butterfly valve which is operative to direct a proportion of the exhaust gasses to the turbocharger 32 along a first exhaust path 58, and the remainder of the exhaust gasses directly to an exhaust outlet 60 along a second exhaust path 62 through a silencer 64. The exhaust gasses which are diverted to the turbocharger 32, exit from the turbocharger 32 via another exhaust path 66 to the silencer 64.

The operation of the waste gate valve 52 is under the control of EMS 20 via control line 68 for controlling the proportion of exhaust gasses diverted to turbo-charger 32, and hence controls the extent to which the turbo-charger 32 boosts the pressure of air delivered to the engine. The amount of compression of the air depends on the proportion of the exhaust gasses diverted to the turbocharger 32, which is variable when the engine is operating on gaseous fuel under the control of (EMS) 20. Typically, (EMS) 20 comprises a micro processor which is responsive to engine speed, provided by an engine speed input signal via signal line 70, and also the required engine demand or load, which may be measured or determined from the position of the engine governor or throttle, to provide an input signal via signal line 72 to EMS 20. The position of the butterfly flap in valve 52 can be altered to vary the proportion of the exhaust gasses fed to the turbocharger 32, by a pneumatic ram which may be powered by compressed air derived, for example, from an air brake circuit of a vehicle in which the engine 10 may be provided.

Operation of the engine 10 shown in FIG. 1 will now be described. The position of the exhaust control valve 52 is controlled in such a manner that a proportion of the exhaust gasses pass from the engine 10 directly to the silencer 64 and hence to the exhaust outlet 60, according to predetermined settings derived from (EMS) 20 which optimises the boost pressure of air delivered to the engine. The proportion of exhaust gas diverted to turbocharger 32 may vary from zero to a greater proportion of the exhaust gas flow and is dependent on the explosive or uncontrolled ignition potential of the engine operating regime. The amount of the compression of the air, or boost pressure, is preferably maintained below a level which can cause problems with uncontrolled burning of the gaseous fuel, but at a level to at least maintain the efficiency of, and typically improve the efficiency of, the engine when operating on diesel fuel, or when operating on a gaseous fuel, such as natural gas or liquid petroleum gas.

A second embodiment of the invention will now be described with reference to FIG. 3.

Figure 3:
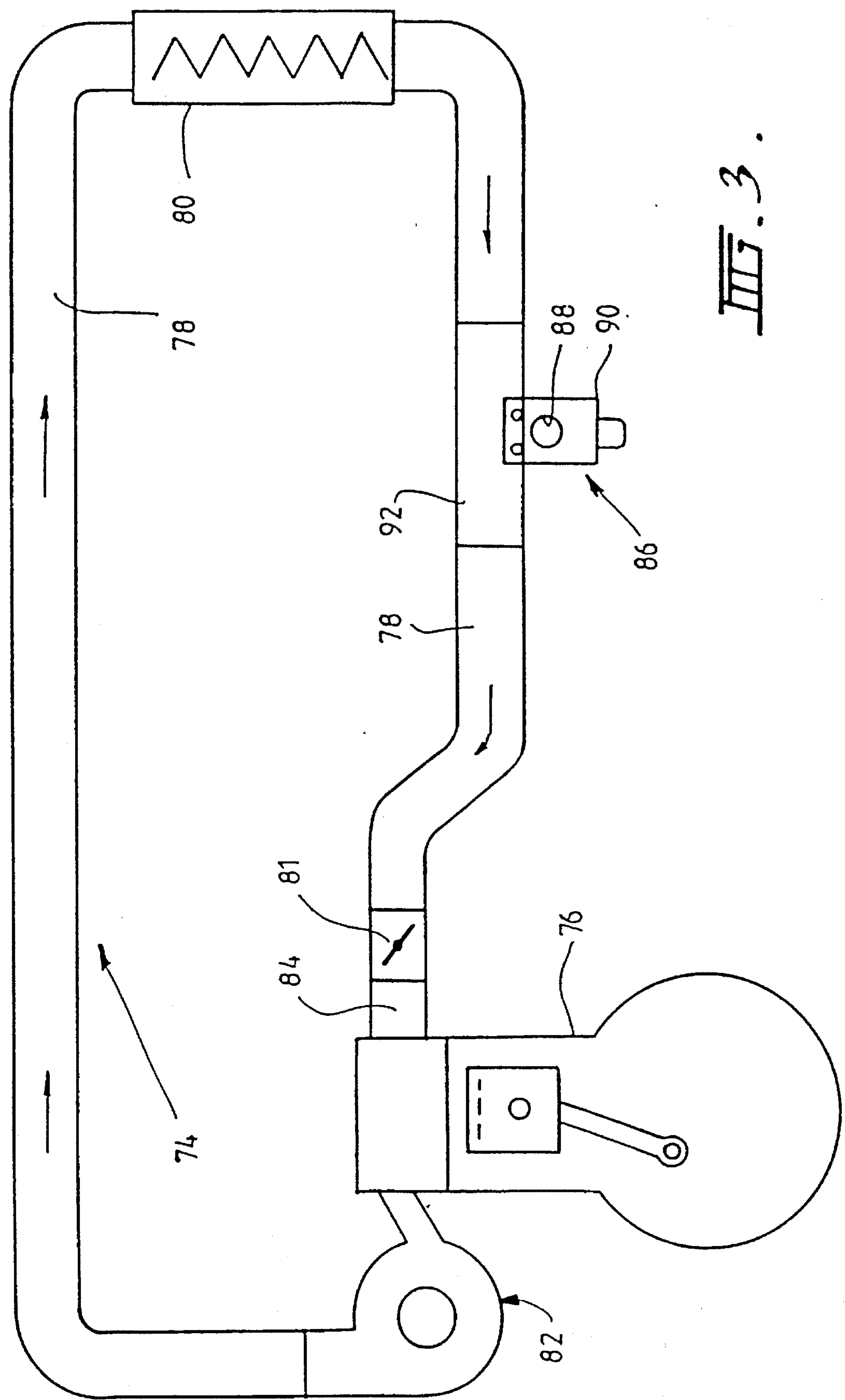
FIG. 3 is a schematic representation of a second embodiment of a boost pressure control apparatus according to the invention; and, FIGS. 4 (*a*) and (*b*) are a side elevation and section view respectively of an embodiment of a boost pressure control valve employed in the apparatus of FIG. 3.

The boost pressure control apparatus illustrated in FIG. 3 comprises air delivery means 74 or delivering air to a gas fuelled internal combustion engine 76 to support combustion of a gaseous fuel therein. In this embodiment, air delivery means 74 comprises an air delivery line 78 and an air cooling device 80, or intercooler for cooling the air prior to its delivery to the engine. Boost pressure is provided by air compression means 82 in the form of a turbocharger, which is driven by exhaust gasses from the engine 76 in a similar manner to the turbocharger 32 of the embodiment illustrated in FIG. 1. Air delivery means 74 further comprises a manifold valve 81 for controlling the volume of air delivered to the engine via the inlet manifold 84.

Figure 4A:
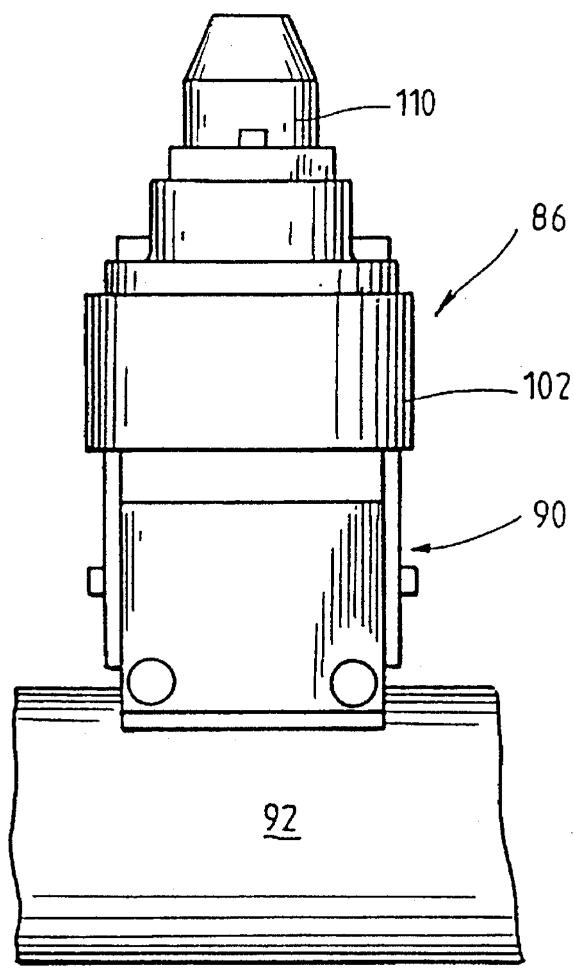
Figure 4B:
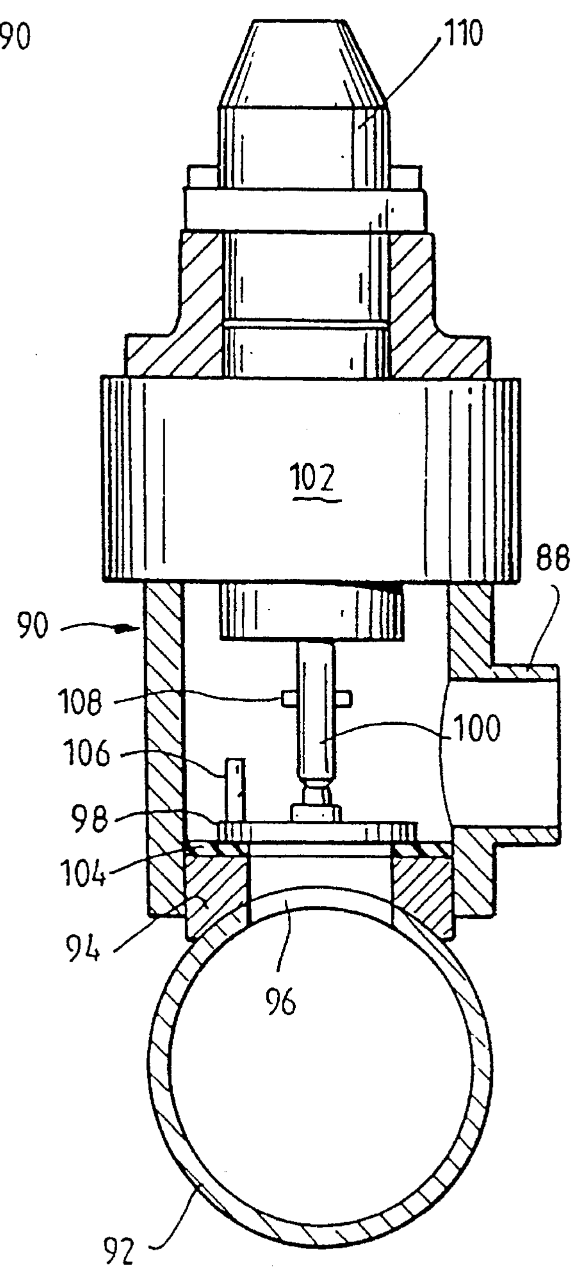

The boost pressure control apparatus further comprises air control means comprising a boost pressure control valve 86 or controlling the boost pressure of air delivered from the turbocharger 82 to the engine. The air control means further comprises a processor means (not illustrated) which is responsive to at least one operating parameter of the engine for controlling the operation of the boost pressure control valve 86. In this embodiment, the boost pressure control valve 86 is located downstream from the turbocharger 82 and intercooler 80, and is adapted to dump air directly from the air delivery line 78 prior to its delivery to the inlet manifold 84 of the engine. Dumped air exits to atmosphere from the boost pressure control valve 86 via orifice 88 located in a side wall of the valve housing 90. FIG. 4 is a detailed enlargement of the boost pressure control valve 86 employed in the apparatus of FIG. 3.

The boost pressure control valve 86 is mounted onto a section of aluminium tube 92 which connects in line with the air delivery line 78 (FIG. 3). A valve seat 94 is located over an aperture 96 provided in the tube 92 through which air is dumped from the air delivery line 78 by the boost pressure control valve 86. A valve plate 98 is driven by the shaft 100 of an electric stepper motor 102. The stepper motor 102 is a variable speed electric motor which is responsive to a control signal from the processor means (not illustrated), for lifting the valve plate 98 so as to open or close the aperture 96 to varying degrees. A rubber seal 104 is provided between the valve plate 98 and valve seat 94. A pin 106 which is fixed the valve seat 94 serves to prevent the valve plate 98 from rotating as the motor moves the lead screw (shaft 100), so that as motor 102 rotates, shaft 100 and valve plate 98 move axially to open or close aperture 96. A second pin. 108 on shaft 100 limits the axial movement of the shaft 100 and valve plate 98 in a direction towards motor 102.

Feed-back means in the form of a potentiometer 110 is mounted above the electric motor 102, and is mechanically coupled to shaft 100. Potentiometer 110 generates a feed-back signal for transmission to the processor means, the feed-back signal providing an indication of an operating condition of the boost pressure control valve.

The stepper motor 102 in this embodiment of the boost pressure control valve is configured to drive at two different set speeds: a low speed for when the boost pressure is close to a set value, and a high speed when the actual boost pressure is significantly different from the set value. When the actual boost pressure is the same as or only slightly greater than or less than the set value, the motor remains stationery. This form of differential control of the stepper motor 102 minimises unstable operation of the boost pressure control valve 86. The operation of the boost pressure control valve 86 is as follows.

The boost pressure control valve 86 is directed control boost pressures as determined by the processor means, typically incorporated in an electronic engine management system, as a function of at least one operating parameter the engine, for example, engine speed and load. Generally, high loads call for high boost pressures, so that if the pressure is too low the valve will shut. As the boost pressure builds up it is permitted to rise slightly above the desired pressure before the boost pressure control valve is opened. If the boost pressure as detected by a pressure sensor (net illustrated, but similar to sensor 44 in FIG. 1) is too high, the action of dumping air from the air delivery line connected to the inlet manifold has two outcomes:

(1) The pressure of air in the manifold starts decrease, (akin to a load or partial short circuit); and, (2) The mass flow of air through the engine and the turbine of turbocharger 82 decreases, thereby lowering its output and slowing compressor speed. The mass air flow through the compressor is greater than the mass flow through the turbine and therefore absorbs extra power. The net effect is that a new operating point of the engine is attained but at a lower boost pressure than before.

The feed-back signal from potentiometer 110 can be used for internal diagnostics within the engine management system to check that the boost pressure control valve is moving as directed, and is fully closed during particular operational conditions of the engine, for example, during overrun (throttle position zero but engine speed high, ie, when vehicle is driving the engine).

From FIG. 3 it can be seen that the air control system for engine 76 encompasses two discreet systems which work together, namely, a manifold valve position system and a boost pressure control system as described above. These two sub-systems are generally required for a turbocharged engine. The first enables operation at low manifold absolute pressures, ie, below atmospheric pressures. The actual position of the manifold valve is determined by engine testing and/or design parameter requirements. If engine load or output is sufficiently high the turbocharger 82 will supply the engine with pressurised air, ie, boosted above atmospheric pressure. In order to achieve the desired gas/air ratio and load it is necessary to control the boost pressure to an optimum value.

Turbocharger 82 is a passive device and responds in a positive feed-back sense to exhaust mass flow rate and temperature, ie, the higher the flow rate the higher the boost pressure. The required level of boost pressure or manifold valve position is calculated by the engine management system via a look-up table as a primary function of percentage full load and speed. The advantage of this form of control is that the control is imposed on the turbocharger 82 as required, ie, the natural performance or characteristics of the turbocharger 82 are overridden. This may be contrasted with a simple fixed boost pressure control system, sometimes called a waste gate valve, which is a mechanical system where direct action of boost pressure opens up an exhaust by pass valve upstream the turbocharger and modulates the boost pressure to a fixed maximum value. In this case, a portion of the load-speed envelope would be truncated to a set boost pressure.

The improved control over engine performance which is achievable using the boost pressure control apparatus and method according to the invention, is best illustrated with reference to the graphical representations of manifold absolute pressure as a function of engine speed and load/torque provided in FIGS. 2 (*a*), (*b*) and (*c*).

Figure 2A:
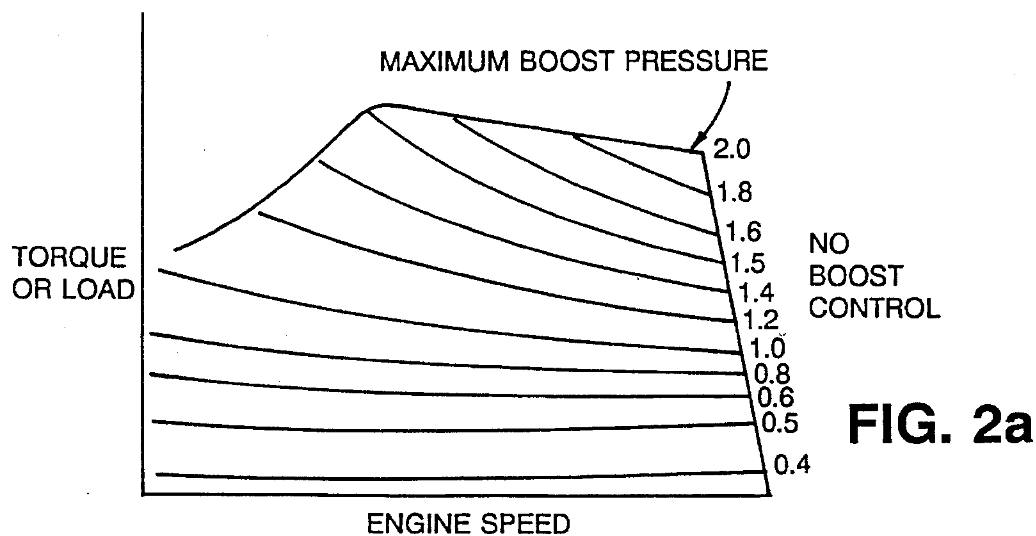
FIG. 2 (*a*), (*b*) and (*c*) are graphical representations of manifold absolute pressure as a function of engine speed and load/torque used for comparing the boost pressure control according to the invention with the prior art.
Figure 2B:
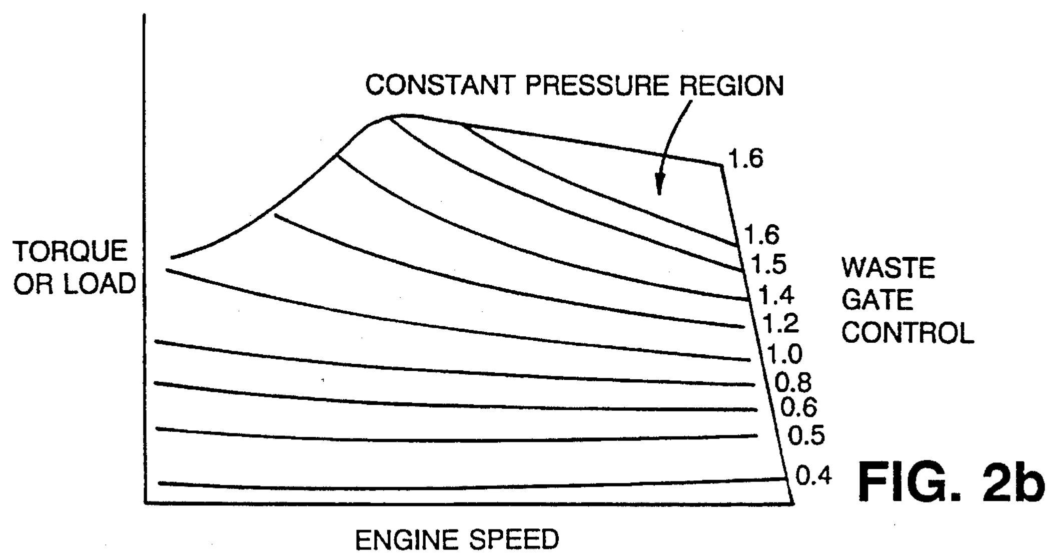
Figure 2C:
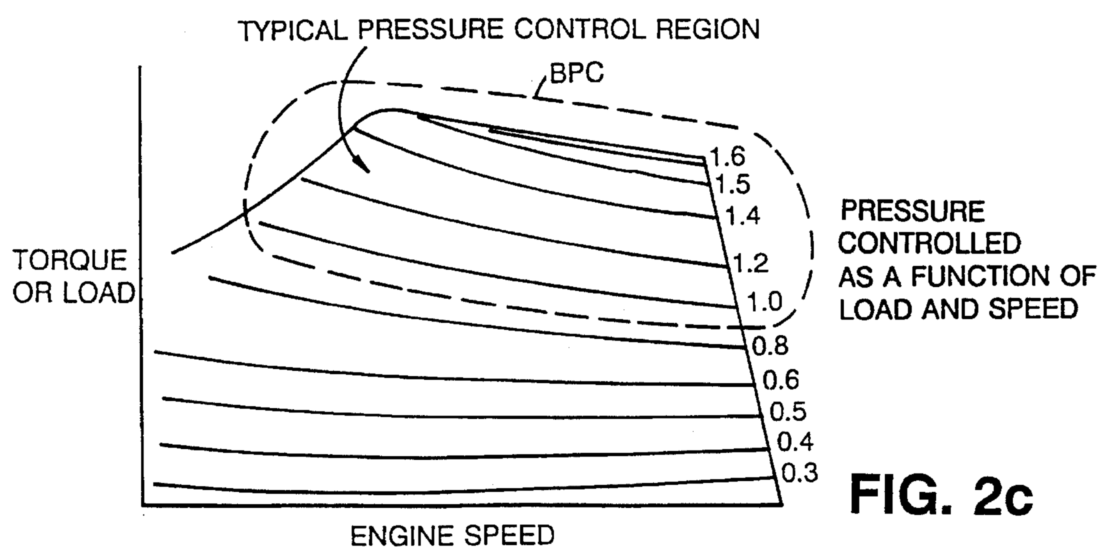

FIG. 2 (*a*) illustrates a torque curve with manifold absolute pressure isobars superimposed thereon, for an engine having no boost pressure control, for example, a turbocharged diesel engine. At maximum speed the turbocharger provides maximum boost pressure. (2.0 in FIG. 2 (*a*)).

FIG. 2 (*b*) illustrates the manifold absolute pressure in response to changes in engine speed and torque/load for a turbo-charge engine incorporating a known waste gate fixed pressure bypass valve. Whenever the manifold absolute pressure exceeds a predetermined value the waste gate valve is opened resulting in a constant pressure region in the engine torque curve. (Shown as 1.6 in FIG. 2 (*b*)).

FIG. 2 (*c*) illustrates the typical boost pressure control BPC region for a turbocharged engine in which the boost pressure is controlled as a function of load and speed accordance with the invention. Boost pressure control accordance with the invention enables the boost pressure to be continuously varied in response to changes in engine speed and load to achieve improved performance from the engine.

The boost pressure control may also be effected response to changes in other operating parameters of the engine, for example, the manifold absolute pressure, the pressure and temperature of the gaseous fuel, air temperature, engine phase and battery voltage.

Now that several embodiments of the boost pressure control apparatus according to the invention have been described in detail numerous modifications and variations will suggest themselves to persons skilled in the mechanical arts. For example, in place of a turbocharger, if desired a supercharger may be employed as the air compression means. In such an arrangement, the amount of air delivered to the super charger may be varied responsive to an operating parameter of the engine, and the charged air may be mixed with naturally aspirated air prior to delivery to the engine so that the degree of compression of the air actually delivered to the engine can be varied. Furthermore, although a preferred form of boost pressure control valve has been described in detail, any suitable valve means can be provided to enable a variable proportion of charged air to be delivered to the engine. The valve means may comprise a closure member movable by an air vane or other actuating member. For example, where an air vane is provided, the compressed air to operate the pneumatic ram may be derived from an air brake system of the vehicle in which the engine may be used. Alternatively, the actuating member may comprise an hydraulic actuator, the fluid to operate the actuator being derived from pressurised lubricating oil of the engine. All such variations and modifications are to be considered within the scope of the present invention, the nature of which is to be determined from the foregoing description and the appended claims.

I claim:

1. A boost pressure control apparatus for controlling the boost pressure of air delivered to a gas fuelled internal combustion engine, the apparatus comprising;

air delivery means for delivering air to the engine to support combustion of a gaseous fuel;

air compression means for boosting the pressure of air delivered to the engine by said air delivery means above an ambient pressure; and, air control means, responsive to at least one operating parameter of the engine, for controlling the boost pressure of air delivered from said air compression means to the engine, said air control means comprising a boost pressure control valve which is operated under the control of a processor means responsive to said at least one operating parameter, said boost pressure control valve being located downstream from the air compression means and adapted to dump air directly from an air delivery line delivering air to an inlet manifold of the engine, wherein said boost pressure control valve is actuated by a variable speed electric motor responsive to a control signal from said processor means and wherein the speed of operation of the valve can be varied to provide differential control of the boost pressure control valve and minimize unstable operation whereby, in use, the boost pressure can be continuously varied in response to changes in said at least one operating parameter to achieve improved performance from the engine.

2. A boost pressure control apparatus for controlling the boost pressure of air delivered to a gas fuelled internal combustion engine, the apparatus comprising;

air delivery means for delivering air to the engine to support combustion of a gaseous fuel;

air compression means for boosting he pressure of air delivered to the engine by said air delivery means above an ambient pressure; and, air control means, responsive to at least one operating parameter of the engine, for controlling the boost pressure of air delivered from said air compression means to the engine, said air control means comprising a boost pressure control valve which is operated under the control of a processor means responsive to said at least one operating parameter, said boost pressure control valve being located downstream from the air compression means and adapted to dump air directly from an air delivery line delivering air to an inlet manifold of the engine, wherein said boost pressure control valve is actuated by a variable speed electric motor responsive to a control signal from said processor means and wherein the speed of operation of the valve can be varied to provide differential control of the boost pressure control valve and minimize unstable operation whereby, in use, the boost pressure can be continuously varied in response to changes in said at least one operating parameter to achieve improved performance from the engine, and wherein said electric motor is an electric stepper motor having a screw threaded drive shaft, and wherein said boost pressure control valve comprises a valve plate which seats on a valve seat, and which is driven by said drive shaft of the stepper motor for moving the valve plate relative to the valve seat so as to open or close the boost pressure control valve to varying degrees.

3. A boost pressure control apparatus as claimed in claim 2, wherein said valve plate is mounted on the end of the motor drive shaft and is prevented from rotating as the stepper motor moves the drive shaft, so that as the stepper motor rotates both the valve plate and the drive shaft move axially to open or close the boost pressure control valve.

4. A boost pressure control apparatus as claimed in claim 3, wherein said boost pressure control valve further comprises feed-back means for generating a feed-back signal for transmission to said processor means, said feed back signal providing an indication of an operating condition of the boost pressure control valve.

5. A boost pressure control apparatus as claimed in claim 4, wherein said feed-back means comprises a potentiometer which is mechanically coupled to the drive shaft of the stepper motor.

6. A method of controlling boost pressure of air delivered to a gas fuelled internal combustion engine, the method comprising:

delivering air to the engine to support combustion of a gaseous fuel;

boosting the pressure of air delivered to the engine above an ambient temperature; and, regulating the boost pressure of air delivered to the engine, wherein said step of regulating the boost pressure comprises:

detecting the actual pressure of air delivered to the engine;

calculating a desired pressure of air delivered to the engine in accordance with said at least one operating parameter;

comparing the actual pressure with the desired pressure of air delivered to the engine; and, actuating a boost pressure control valve as required to lower or increase the boost pressure of air delivered to the engine, and wherein said step of actuating the boost pressure control valve comprises:

operating the valve at a first speed when the actual pressure is above or below the desired pressure by a first prescribed amount; and, operating the valve at a second speed which is higher than said first speed when the actual pressure is above or below the desired pressure by a second prescribed amount which is greater than the first prescribed amount, whereby, in use, the boost pressure can be continuously varied in response to changes in said at least one operating parameter to achieve improved performance from the engine.

7. A method of controlling boost pressure as claimed in claim 6, wherein the boost pressure control valve is operated at a low speed when the actual boost pressure is close to the desired pressure of air, and at a high speed when the actual boost pressure is significantly different from the desired pressure of air.

8. A method of controlling boost pressure as claimed in claim 7, further comprising generating a feed-back signal indicative of an operating condition of the boost pressure control valve.

9. A method of controlling boost pressure in any one of claims 6 to 8, wherein said at least one operating parameter includes the engine speed and load.

* * * * *

UNITED STATES PATENT AND TRADEMARK OFFICE
CERTIFICATE OF CORRECTION

PATENT NO. : 5,477,840

DATED : December 26, 1995

INVENTOR(S) : Barry R. Neumann

It is certified that error appears in the above-identified patent and that said Letters Patent is hereby corrected as shown below:

Col. 5, line 22, "or" should be --for--;
line 36, "or" should be --for--;
line 61, after "fixed" insert --to--.

Col. 6, line 18, after "directed" insert --to--;
line 21, after "parameter" insert --of--;
line 31, after "starts" insert --to--.

Col. 7, line 8, after "upstream" insert --of--;
line 32, after "speed" insert --in--;
line 33, after "control" insert --in--;
line 37, after "effected" insert --in--.

Col. 8, line 35, "he" should be --the--.

Signed and Sealed this

Twenty-ninth Day of October 1996

Attest:

BRUCE LEHMAN

*Attesting Officer* *Commissioner of Patents and Trademarks*